(12) United States Patent
Jeong et al.

(10) Patent No.: US 11,184,332 B2
(45) Date of Patent: Nov. 23, 2021

(54) USER TERMINAL DEVICE, ELECTRONIC DEVICE, SYSTEM COMPRISING THE SAME AND CONTROL METHOD THEREOF

(71) Applicant: SAMSUNG ELECTRONICS CO., LTD., Suwon-si (KR)

(72) Inventors: Younghun Jeong, Suwon-si (KR); Intae Jeon, Suwon-si (KR); Jiyeon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 252 days.

(21) Appl. No.: 16/245,395

(22) Filed: Jan. 11, 2019

(65) Prior Publication Data
US 2019/0222561 A1 Jul. 18, 2019

(30) Foreign Application Priority Data
Jan. 12, 2018 (KR) .................. 10-2018-0004645

(51) Int. Cl.
*H04L 29/06* (2006.01)
*H04W 12/02* (2009.01)
(Continued)

(52) U.S. Cl.
CPC .......... *H04L 63/0428* (2013.01); *H04L 63/08* (2013.01); *H04L 63/0876* (2013.01);
(Continued)

(58) Field of Classification Search
CPC .................. H04L 63/0428; H04L 63/0876
See application file for complete search history.

(56) References Cited

U.S. PATENT DOCUMENTS

| 6,415,439 B1* | 7/2002 | Randell .................. A63H 30/04 348/61 |
| 8,732,451 B2 | 5/2014 | Viswanathan et al. |

(Continued)

FOREIGN PATENT DOCUMENTS

| EP | 2 395 464 A1 | 12/2011 |
| JP | 5390844 | 1/2014 |

(Continued)

OTHER PUBLICATIONS

International Search Report and Written Opinion dated Apr. 22, 2019, issued in International Application No. PCT/KR2019/000495.

(Continued)

*Primary Examiner* — Esther B. Henderson
(74) *Attorney, Agent, or Firm* — Nixon & Vanderhye P.C.

(57) ABSTRACT

A user terminal device is provided. The user terminal device includes a storage configured to store identification information of an external electronic device sharing a predetermined encryption scheme; a communicator comprising communication circuitry; and a processor configured to control the user terminal device to: encrypt a request input in an encryption mode based on the predetermined encryption scheme, transmit the encrypted request including the identification information of the electronic device to an external server through the communicator, and decrypt and provide an encrypted response based on the predetermined encryption scheme, based on the encrypted response to the encrypted request being obtained from the server.

14 Claims, 17 Drawing Sheets

(51) Int. Cl.
*H04W 12/06* (2021.01)
*H04W 12/033* (2021.01)

(52) U.S. Cl.
CPC ......... *H04W 12/02* (2013.01); *H04W 12/033* (2021.01); *H04W 12/06* (2013.01)

(56) References Cited

U.S. PATENT DOCUMENTS

| | | | |
|---|---|---|---|
| 9,413,728 B2 | 8/2016 | Watanabe | |
| 2002/0133606 A1* | 9/2002 | Mitomo | H04L 67/02 709/229 |
| 2004/0131014 A1* | 7/2004 | Thompson, III | H04H 60/06 370/230 |
| 2006/0075137 A1* | 4/2006 | Maekawa | H04L 29/12509 709/245 |
| 2008/0162924 A1* | 7/2008 | Chinitz | H04L 63/20 713/153 |
| 2010/0169638 A1* | 7/2010 | Farris | H04L 63/0428 713/153 |
| 2010/0299518 A1* | 11/2010 | Viswanathan | H04L 63/0485 713/152 |
| 2011/0091037 A1* | 4/2011 | Pinder | H04L 9/0897 380/255 |
| 2011/0235806 A1 | 9/2011 | Fukuda | |
| 2012/0054485 A1* | 3/2012 | Tanaka | H04N 7/18 713/150 |
| 2016/0094988 A1 | 3/2016 | Lee et al. | |
| 2016/0330182 A1 | 11/2016 | Jeon et al. | |
| 2017/0093824 A1 | 3/2017 | Shulman et al. | |
| 2018/0096546 A1* | 4/2018 | Bartels | G07C 9/00309 |
| 2019/0222561 A1* | 7/2019 | Jeong | H04L 63/08 |

FOREIGN PATENT DOCUMENTS

| | | |
|---|---|---|
| JP | 5973049 | 8/2016 |
| KR | 10-2012-0026499 A | 3/2012 |
| KR | 10-2013-0059796 | 6/2013 |
| KR | 10-2016-0132302 | 11/2016 |
| KR | 10-2017-0052427 | 5/2017 |
| KR | 10-2017-0100403 | 9/2017 |
| WO | 2017/108412 | 6/2017 |

OTHER PUBLICATIONS

Extended European Search Report dated Nov. 12, 2020 for EP Application No. 19738124.7.
Korean Office Action dated Aug. 24, 2021 for KR Application No. 10-2018-0004645.

* cited by examiner

USER TERMINAL DEVICE, ELECTRONIC DEVICE, SYSTEM COMPRISING THE SAME AND CONTROL METHOD THEREOF

CROSS-REFERENCE TO RELATED APPLICATION

This application is based on and claims priority under 35 U.S.C. § 119 to Korean Patent Application No. 10-2018-0004645, filed on Jan. 12, 2018, in the Korean Intellectual Property Office, the disclosure of which is incorporated by reference herein in its entirety.

BACKGROUND

Field

The disclosure relates to a user terminal device, an electronic device, a system comprising the same, and a control method thereof, and, for example, to a user terminal device for performing communication through an electronic device, and a control method thereof.

Description of Related Art

As the usage of smart phones and the size of mobile contents are increasing, network connection using Wi-Fi outside is increasing. On the other hand, there are cases in which malicious networks are provided in order to conduct malicious activities such as collecting personal information in such networks, and these cases are gradually increasing. There was a problem in that a user accesses the network without knowing that it is a malicious network, and personal information such as an Internet usage log of the user, etc. may be leaked.

Accordingly, users are increasingly interested in protecting personal information. However, it is generally difficult for users to determine that a network is a malicious network. Also, when it is determined to be the malicious network, there is a limited problem in a method of using a network connection using a Wi-Fi network, unless a paid communication method is used.

SUMMARY

Embodiments of the disclosure address the above disadvantages and other disadvantages not described above.

The disclosure provides a user terminal device for protecting data of a user by communicating with a reliable electronic device through a server, the electronic device, a system comprising the same, and a control method thereof.

According to an embodiment of the disclosure, a user terminal device includes a storage configured to store identification information of an external electronic device sharing a predetermined encryption scheme; a communicator comprising communication circuitry; and a processor configured to control the user terminal device to: encrypt a request input in an encryption mode based on the predetermined encryption scheme, transmit the encrypted request including the identification information of the electronic device to an external server through the communicator, and decrypt and provide an encrypted response based on the predetermined encryption scheme, based on an encrypted response to the encrypted request being obtained from the server.

The identification information of the electronic device may include an IP address of the electronic device.

The server may be a router configured to transmit the encrypted request to another router.

When authentication of the electronic device is performed, the processor may control the user terminal device to register the identification information including the IP address of the electronic device in the encryption mode.

The processor may control the user terminal device to transmit test data including the identification information of the electronic device to the server through each network included in a list of networks connectable with the user terminal device, and identify a risk level of each network based on a response time at which response data for the test data is obtained.

The processor may control the user terminal device to provide the list of networks on a display and display identification information of each network included on the list of networks in a different color based on the risk level of each network.

The processor may control the user terminal device provide the list of networks on the display and execute the encryption mode when a network selected from the list of networks exceeds a predetermined risk level.

According to another embodiment of the disclosure, an electronic device includes a storage configured to store identification information of an external user terminal device sharing a predetermined encryption scheme; a communicator comprising communication circuitry; and a processor configured to control the electronic device to: decrypt an encrypted request based on the predetermined encryption scheme, based on the encrypted request transmitted from the user terminal device being obtained from the server through the communicator, obtain a response corresponding to the decrypted request based on the decrypted request, encrypt the obtained response using (based on) the predetermined encryption scheme, and transmit the encrypted response including the identification information of the user terminal device to the server.

The processor may control the electronic device to access a server corresponding to a service included in the decrypted request to obtain a response to the service, and encrypt the obtained response using the predetermined encryption scheme.

The identification information of the user terminal device may include an IP address of the user terminal device.

The server may be a router configured to transmit the encrypted response to another router.

The storage may store identification information of a first user terminal device and a second user terminal device sharing the predetermined encryption scheme.

The processor may control the electronic device to, based on the identification information of the second user terminal being included in an encrypted request obtained from the first user terminal, obtain an encrypted response to the encrypted request and transmit the encrypted response including the identification information of the second user terminal to the server.

According to another embodiment of the disclosure, a system including a user terminal device and an electronic device sharing a predetermined encryption scheme includes the user terminal device configured to: encrypt a request input in an encryption mode based on the predetermined encryption scheme, and transmit the encrypted request including identification information of the electronic device to a first server; and the electronic device configured to: based on the encrypted request being obtained from a second server communicating with the first server, decrypt the encrypted request based on the predetermined encryption scheme, obtain a response corresponding to the decrypted request based on the decrypted request, encrypt the obtained response using the predetermined encryption scheme, and transmit the encrypted response including identification information of the user terminal device to the second server.

The user terminal device may decrypt and provide the encrypted response based on the predetermined encryption scheme when the encrypted response is received from the first server.

According to another embodiment of the disclosure, a control method of a user terminal device storing identification information of an external electronic device sharing a predetermined encryption scheme includes encrypting a request input in an encryption mode based on the predetermined encryption scheme shared with the electronic device, and transmitting the encrypted request including the identification information of the electronic device to an external server; and based on an encrypted response to the encrypted request being obtained from the server, decrypting and providing the encrypted response based on the predetermined encryption scheme.

The identification information of the electronic device may include an IP address of the electronic device.

The server may be a router configured to transmit the encrypted response to another router.

The control method may further include, when authentication of the electronic device is performed, registering the identification information including the IP address of the electronic device in the encryption mode.

The control method may further include transmitting test data including the identification information of the electronic device to the server through each network included in a list of networks connectable with the user terminal device, and identifying a risk level of each network based on a response time at which response data for the test data is obtained.

The control method may further include providing the list of networks and displaying identification information of each network included on the list of networks in a different color based on the risk of each network.

The control method may further include providing the list of networks and executing the encryption mode when a network selected from the list of networks exceeds a predetermined risk level i.

According to another embodiment of the disclosure, a control method of a device storing identification information of an external electronic device sharing a predetermined encryption scheme includes, based on an encrypted request transmitted from the user terminal device being obtained from a server, decrypting the encrypted request based on the predetermined encryption scheme; obtaining a response corresponding to the decrypted request based on the decrypted request and encrypting the obtained response using the predetermined encryption scheme; and transmitting the encrypted response including identification information of the user terminal device to the server.

The encrypting may include accessing a server corresponding to a service included in the decrypted request to obtain a response to the service, and encrypting the obtained response using the predetermined encryption scheme.

The identification information of the user terminal device may include an IP address of the user terminal device The server may be a router configured to transmit the encrypted response to another router.

The control method may further include storing identification information of a first user terminal device and a second user terminal device sharing the predetermined encryption scheme; based on the identification information of the second user terminal being included in an encrypted request obtained from the first user terminal, obtaining an encrypted response to the encrypted request; and transmitting the encrypted response including the identification information of the second user terminal to the server.

As described above, according to various example embodiments of the disclosure, a user terminal device provides a risk level of a network connectable with the user terminal device such that a user may easily recognize a risk to a malicious network, thereby improving user convenience.

Also, even when a high-risk network is selected, a high level of security is ensured by communicating with an electronic device through a server.

Additional and/or other aspects and advantages of the disclosure will be set forth in part in the description which follows and, in part, will be obvious from the description, or may be learned by practice of the disclosure.

BRIEF DESCRIPTION OF THE DRAWINGS

The above and/or other aspects, features and advantages of certain embodiments of the disclosure will be more apparent from the following detailed description, taken in conjunction with the accompanying drawings, in which.

DETAILED DESCRIPTION

Figure 1:
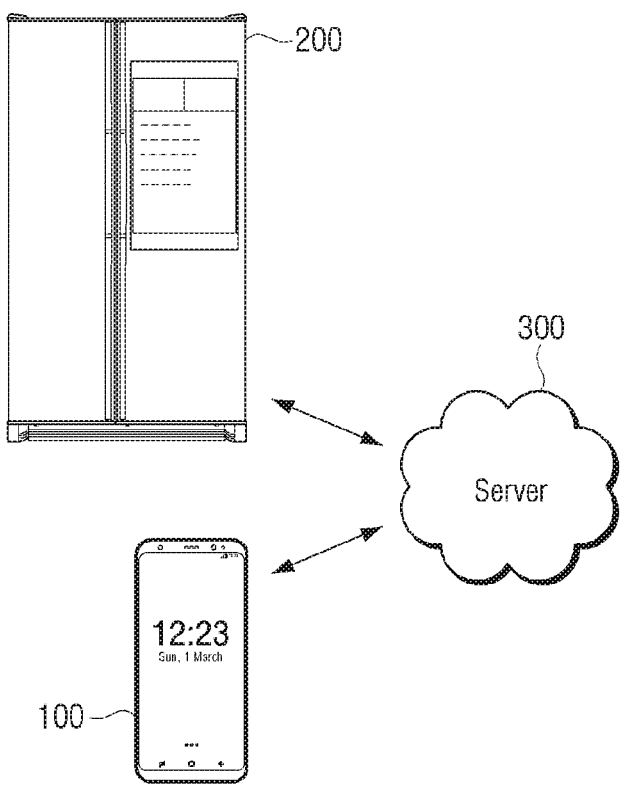
FIG. 1 is a diagram illustrating an example electronic system according to an embodiment of the disclosure.

Hereinafter, the disclosure will be described in greater detail with reference to the accompanying drawings, in which various example embodiments of the disclosure are shown. While describing the disclosure, detailed descriptions about related well known functions or configurations that may blur the points of the disclosure may be omitted. The disclosure may, however, be embodied in many different forms and should not be understood as being limited to the embodiments set forth herein; rather these embodiments are provided such that this disclosure will be thorough and complete.

"Comprising" may denote, for example, that other components may be included, rather than excluding other components, unless specifically stated otherwise. Further, various elements and regions in the drawings may be schematically illustrated. Accordingly, the technical spirit of the disclosure is not limited by the relative size or spacing illustrated in the accompanying drawings.

Also, the expression 'at least one of a, b and c' may be interpreted as 'a', 'b', 'c', 'a and b', 'a and c', 'b and c' and/or 'a, b, and c'.

Hereinafter, various example embodiments of the disclosure will be described in greater detail with reference to the accompanying drawings.

FIG. 1 is a diagram illustrating an example electronic system according to an embodiment of the disclosure.

Referring to FIG. 1, the electronic system includes a user terminal device 100, an electronic device 200, and a server 300.

The user terminal device 100 may be connected to a first network and may communicate with the server 300 via the first network. For example, the first network may be a Wi-Fi network, but is not limited thereto, and may be implemented in various wireless networks.

The user terminal device 100 may be implemented, for example, and without limitation, as a mobile phone such as a smart phone, or the like, capable of network connection, but is not limited thereto, and may be implemented, for example, and without limitation, as a tablet, a laptop computer, a PC, or the like.

According to an embodiment, when a user request is input, the user terminal device 100 may transmit the input request to the server 300 via the first network. For example, the server 300 may be implemented, for example, and without limitation, as a router, or the like, functioning to connect different networks. For example, the server 300 may perform a function of connecting the first network to which the user terminal device 100 is connected and a second network to which the electronic device 200 is connected.

The electronic device 200 may be connected to the second network and may communicate with the server 300 via the second network. For example, the second network may be a Wi-Fi network, but is not limited thereto and may be implemented in various wireless networks. For example, the second network may be a non-public type network that is more secure than the first network which is a public type network. For example, the non-public type network may be a network that needs to perform a separate authentication procedure to access the network, and the public type network may be a network that does not require the separate authentication procedure to access the network, but the disclosure is not limited thereto.

According to an embodiment, the electronic device 200 may be implemented in various types of home appliances such as, for example, and without limitation, a TV, a PC, a washing machine, a refrigerator, an air conditioner, or the like, but is not limited thereto and may be implemented as various IoT devices or the like at home and in the company. For example, because the electronic device 200 requires the separate authentication procedure, the electronic device 200 may be implemented as a home appliance connected to a home network with a relatively excellent (high) security.

Meanwhile, according to various embodiments of the disclosure, the first network to which the user terminal device 100 is connected may be a network which is vulnerable to security (e.g., having relatively low security). For example, when a user request is input, the user terminal device 100 may execute an encryption mode based on a user command or automatically to transmit an encrypted request to the electronic device 200 connected to the second network with the excellent security such that the user request is processed via the second network.

Hereinafter various example embodiments of the disclosure will be described in greater detail with reference to the drawings.

Figure 2A:
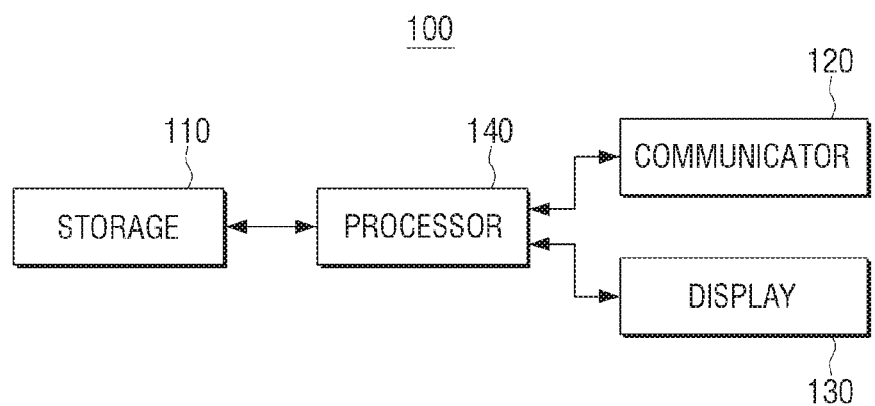
FIG. 2A is a block diagram illustrating an example configuration of a user terminal device according to an embodiment of the disclosure.

FIG. 2A is a block diagram illustrating an example configuration of the user terminal device 100 according to an embodiment of the disclosure.

Referring to FIG. 2A, the user terminal device 100 includes a storage 110, a communicator (e.g., including communication circuitry) 120, and a display 130 and a processor (e.g., including processing circuitry) 140.

The storage 110 may store a control program for controlling the user terminal device 100 and the processor 140, an application initially provided from a manufacturer or downloaded from outside, a graphical user interface (hereinafter referred to as a "GUI") related to the application, an object (e.g., image text, icons, buttons, etc.) for providing the GUI, user information, documents, databases, or related data.

For example, the storage 110 may store identification information about an external electronic device 200 that has been authenticated according to a predetermined authentication procedure. For example, the storage 110 may store a product name, a serial number, an IP address, and the like of the external electronic device 200.

The storage 110 may store programs, software, and the like that support a predetermined encryption scheme. For example, the predetermined encryption scheme may be, for example, an encryption scheme using a symmetric key (a secret key) (e.g., block encryption such as DES, AES, SEED, HIGHT, etc. and string encryption), an encryption scheme using an asymmetric key (a public key) (e.g., RSA, ElGamal, ECC, etc.), an encryption scheme using a hash function (e.g., SHA, HAS-160), or the like, but is not limited thereto.

The storage 110 may store authentication information for performing authentication with respect to the external electronic device 200. For example, the storage 110 may include a password, a PIN code, fingerprint information, iris information, facial recognition information, and the like necessary for performing authentication with the external electronic device 200, but the information is not limited thereto.

The storage 110 may also store an encryption module that supports an encryption service in an encryption mode according to an embodiment of the disclosure. The encryption mode will be described in greater detail below.

When an encryption scheme shared by the user terminal device 100 and the external electronic device 200 is an asymmetric key method, the storage 110 may store a public key and a secret key corresponding thereto. When the encryption scheme shared by the user terminal device 100 and the external electronic device 200 is a symmetric key method, the storage 110 may store the symmetric key.

The storage 110 may, for example, and without limitation, be implemented as an internal memory such as a ROM or a RAM included in the processor 140 or may be implemented as a separate memory from the processor 140, but is not limited thereto. In this case, the storage 110 may be implemented as a memory embedded in the user terminal device 100, a memory detachable from the user terminal device 100, or the like, based on the purpose of data storage. For example, data for driving the user terminal device 100 may be stored in the memory embedded in the user terminal device 100, and data for an extension function of the user terminal device 100 may be stored in the memory detachable from the user terminal device 100. The memory embedded in the user terminal device 100 may be implemented in the form of a nonvolatile memory, a volatile memory, a hard disk drive (HDD), a solid state drive (SSD), or the like, but is not limited thereto.

The communicator 120 may include various communication circuitry connected to the first network and may perform communication with the server 300. For example, the first network may be implemented as, for example, and without limitation, a wireless fidelity (WI-FI) network, or the like, and accordingly, the communicator 120 may include a Wi-Fi module including various Wi-Fi communication circuitry, but is not limited thereto.

In addition, the communicator 120 may perform wireless communication with the external electronic device 200 through any of a variety of communication methods such as, for example, and without limitation, BT (BlueTooth), Zigbee, IR (Infrared), or the like, but may perform communication with the external electronic device 200 and the server 300 through various communication methods such as, for example, and without limitation, Serial Interface, USB (Universal Serial Bus), NFC (Near Field Communication), or the like.

According to an embodiment, the user terminal device 100 may perform authentication with the external electronic device 200 based on a predetermined event.

When the predetermined event occurs, the communicator 120 may perform communication with the external electronic device 200 using a predetermined communication method and may be in an interlocking state. For example, interlocking may refer, for example, to any state in which communication between the user terminal device 100 and the external electronic device 200 is possible, such as an operation for initializing communication, an operation for forming a network, an operation for performing device pairing, or the like.

For example, when mutual authentication is performed between the user terminal device 100 and the external electronic device 200 using the predetermined method, device identification information of the external electronic device 200 may be provided to the user terminal device 100, and accordingly a pairing procedure between both devices may be performed. For another example, when the predetermine event occurs in the user terminal device 100 or the external electronic device 200, a peripheral device may be searched through, for example, DLNA (Digital Living Network Alliance) technology, and the pairing operation may be performed with the searched device and may be in the interlocking state. For example, the predetermined method may be, for example, and without limitation, NFC, a key exchange protocol specified in the OIC standard, Easy Setup, or the like, when an IoT environment is used. The predetermined method may be a method of encrypting a key used by an AP providing a routing function, and a method in which a user directly inputs a key to the user terminal device 100 and a PC such that the PC serves as the external electronic device 200. Hereinafter, for the convenience of explanation, a method using the Tot environment will be described in greater detail, but it will be understood that the disclosure is not limited thereto.

Through this pairing process, the communicator 120 may obtain the identification information of the external electronic device 200 from the external electronic device 200 and store the obtained identification information in the storage 110.

The display 130 may be implemented in various forms such as, for example, and without limitation, a liquid crystal display (LCD), an organic light-emitting diode (OLED), a liquid crystal on silicon (LCoS), a digital light processing (DLP), a quantum dot (QD) display panel, or the like.

The display 130 displays a screen. For example, the screen may include various contents such as, for example, and without limitation, an image, a moving image, a text, a music, or the like, an application execution screen including various contents, a GUI (Graphic User Interface) screen, or the like.

The display 130 may be implemented, for example, and without limitation, as an LCD (Liquid Crystal Display Panel), an OLED (Organic Light Emitting Diodes), or the like, but is not limited thereto. For example, the display 130 may be implemented as a touch screen having a mutual layer structure with a touch pad. The display 130 may be used as a user interface (not shown) in addition to an output device. For example, the touch screen may be configured to detect a touch input pressure as well as touch input position and area.

The processor 140 may include various processing circuitry and controls the overall operation of the user terminal device 100.

According to an embodiment, the processor 140 may be implemented, for example, and without limitation, as a digital signal processor (DSP) for processing a digital signal, a microprocessor, a TCON (Time Controller), or the like, but is not limited thereto, and may include one or more of, for example, and without limitation, a central processing unit (CPU), a microcontroller unit (MCU), a micro processing unit (MPU), a controller, an application processor (AP), a communication processor, an ARM processor, or the like, or may be defined as the corresponding term. The processor 140 may also be implemented as a system on chip (SoC) with a processing algorithm embedded therein or large scale integration (LSI) or may be implemented as a field programmable gate array (FPGA).

The processor 140 may encrypt the request input in the encryption mode based on the predetermined encryption scheme and transmit the encrypted request including the identification information of the external electronic device 200 to the server 300 through the communicator 120.

For example, the processor 140 may transmit the encrypted request including the identification information of the external electronic device 200 to the server 300 via the first network. For example, the first network may be a Wi-Fi network, but is not limited thereto, and may be implemented in various wireless networks.

For example, the encryption mode may be a mode supporting an encryption function for a request input from a user. The encryption mode may be executed by the user when the user terminal device 100 and the external electronic device 200 are mutually authenticated based on a predetermined method. For example, when a smart phone is mutually authenticated with a home refrigerator using a NFC method, the encryption mode may be executed. However, the encryption mode may be executed according to a user operation after mutual authentication is completed using the predetermined method. The encryption mode may be executed based on a risk level of a network selected as described, for example, below. The NFC method is merely an example, and the disclosure is not limited thereto.

For example, the identification information of the external electronic device 200 may include an IP address of the external electronic device 200 but is not limited to this. The identification information of the external electronic device 200 may include a product name, a serial number, and the like, but is not limited thereto.

The processor 140 may transmit an encrypted request including the IP address of the external electronic device 200 to the server 300. Accordingly, the server 300 may identify the IP address and transmit the encrypted request to the external electronic device 200.

When an encrypted response to the encrypted request is obtained from the server 300, the processor 140 may decrypt and provide the encrypted response based on a predetermined encryption scheme.

For example, when the decrypted response is a response to connect to a site having a particular URL, the processor 140 may provide the display 130 with a screen of the site corresponding to the decrypted response.

For example, the predetermined encryption scheme may be an encryption scheme using, for example, and without limitation, a symmetric key (a secret key) (e.g., block encryption such as DES, AES, SEED, HIGHT, etc. and string encryption), an encryption scheme using an asymmetric key (a public key) (e.g., RSA, ElGamal, ECC, etc.), an encryption scheme using a hash function (e.g., SHA, HAS-160), or the like, but is not limited thereto.

For example, when the predetermined encryption scheme is an asymmetric key method, in case that the user terminal device 100 previously stores the public key and a private key, and the external electronic device 200 stores the public key owned by the user terminal device 100, the user terminal device 100 may decrypt the response encrypted and transmitted by the external electronic device 200 through the public key using the private key. For example, the public key may be exchanged between the user terminal device 100 and the external electronic device 200 by a predetermined method. For example, the public key may be exchanged in a variety of cases, such as when the smart phone and the home refrigerator are in physical contact using the NFC method in an authentication process for mutual devices, but it will be understood that the disclosure is not limited thereto.

The server 300 may, for example, be a router that transmits the encrypted request to another router. The router may refer, for example, to a device for connecting different networks, and may include a sharer. For example, the server 300 may perform a function of connecting the first network to which the user terminal device 100 is connected and the second network to which the external electronic device 200 is connected.

For example, assuming that a user's smart phone is mutually authenticated with the home refrigerator using a predetermined method and the encryption mode is executed, the user may select Wi-Fi called "Airport" at the airport to access a specific portal site. When a request for accessing the specific portal site via Wi-Fi is input from the user, the request may be transmitted to a router at home, that is, a sharer, through a router in the airport corresponding to Wi-Fi called "Airport".

The processor 140 may register the identification information including the IP address of the external electronic device 200 in the encryption mode when authentication of the external electronic device 200 is performed. For example, when mutual authentication is performed between the smart phone and the home refrigerator using the NFC method, the processor 140 may register an IP address of the refrigerator in the encryption mode and store the IP address. Thereafter, when the encryption mode is executed, the processor 140 may transmit the IP address of the corresponding refrigerator to the server 300 in response to a request input to the smart phone from the user.

The processor 140 may transmit test data including the identification information of the external electronic device 200 to the server 300 via each network included in a list of networks connectable with the user terminal device 100.

For example, the list of networks connectable with the user terminal device 100 may be, for example, an identifiable Wi-Fi list in the user terminal device 100 in a current state. For example, when three Wi-Fi lists are provided in the list of connectable networks, the processor 140 may use each of the provided three Wi-Fi to transmit the test data to the server 300 so as to transmit the test data to the external electronic device 200 registered in the encryption mode.

For example, the test data may be random data for measuring a risk of each network, such as, for example, dummy data having no substantial meaning.

The processor 140 may, for example, identify the risk of each network based on a response time at which response data for the test data is obtained.

Generally, in the absence of a malicious action due to a malicious network, a response time for obtaining response data to the test data is stable, that is, a deviation between response times is short. However, in case that there is the malicious action, the response time may be delayed, which may increase the deviation between response times. Therefore, a predetermined threshold value for the deviation of the response time may be stored in the user terminal device 100 in advance. The processor 140 may identify the risk of each network based on the predetermined threshold value for the deviation of the response time. The predetermined threshold value may be plural.

The processor 140 may provide the list of networks on the display 130 and may display identification information of each network included on the list of networks in a different color based on the risk of each network.

For example, it is assumed that a plurality of predetermined threshold values for the deviation of the response time include a relatively small threshold value for the deviation of the response time as a first threshold value and a relatively larger threshold value for the deviation of the response time than the first threshold value as a second threshold value.

The processor 140 may identify the network as a secure network and display identification information of the network in, for example, a blue color when the deviation of the response time is lower than the first threshold. The processor 140 may identify the network as a risky network in which the malicious action may occur and display identification information of the network in, for example, an orange color when the deviation of the response time is equal to or greater than the first threshold and equal to or less than the second threshold. The processor 140 may identify the network as a network with a high probability of occurrence of the malicious action and display identification information of the network in, for example, a red color when the deviation of the response time is equal to or greater than the second threshold. The user may identify a network having a risk for the malicious action through different coloring of the network information. Accordingly, the user may not select such a network, or select the network having the risk in a state in which the encryption mode is executed, thereby securing security. For example, the color indicating the identification information of the network according to the risk is merely an example, and the disclosure is not limited thereto.

The processor 140 may provide the list of networks on the display 130 and may execute the encryption mode when a network that exceeds a predetermined risk (risk level) is selected on the network list.

For example, the processor 140 may execute the encryption mode when the deviation of the response time is equal to and greater than the second threshold. When the deviation of the response time is equal to or greater than the first threshold, the processor 140 may execute the encryption mode and even when there is a relatively low probability of the malicious action, to execute the encryption mode, thereby increasing the reliability of security. However, the processor 140 may execute the encryption mode when authentication of the external electronic device 200 is completed regardless of the identified risk of each network, or after authentication of the external electronic device 200 is completed, may execute the encryption mode based on a user manipulation.

Figure 2B:
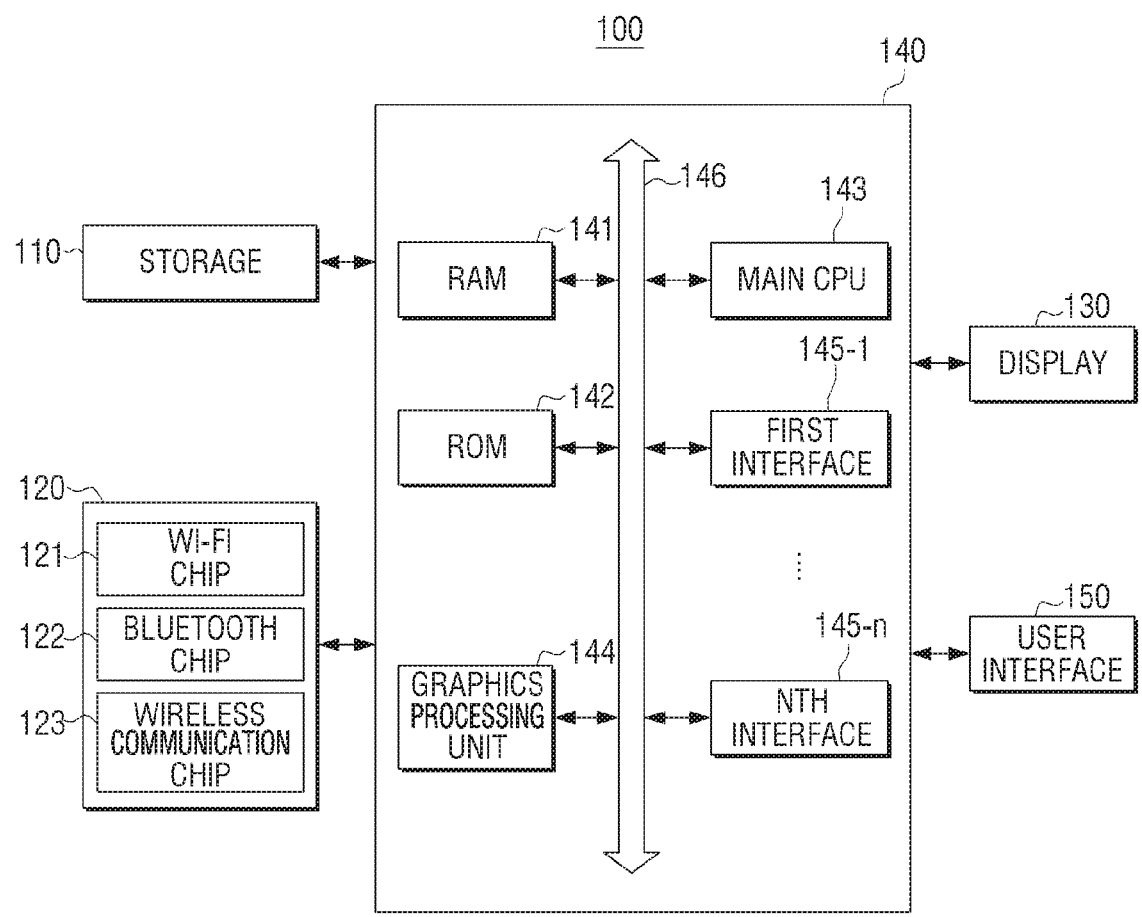
FIG. 2B is a block diagram illustrating an example configuration of the user terminal device of FIG. 2A.

FIG. 2B is a block diagram illustrating an example configuration of the user terminal device 100 of FIG. 2A.

Referring to FIG. 2B, the user terminal device 100 includes the storage 110, the communicator (e.g., including communication circuitry) 120, the display 130, the processor (e.g., including processing circuitry) 140, and the user interface 150. Among the configurations illustrated in FIG. 2B, detailed descriptions of redundant configurations with those shown in FIG. 2A may not be repeated. The communicator 120 may include various communication circuitry and is configured to perform communication with various types of external devices and the server 300 using various types of communication methods. The communicator 120 may include various communication chips including various communication circuitry, such as, for example, and without limitation, a Wi-Fi chip 121, a Bluetooth chip 122, and a wireless communication chip 123, or the like.

The Wi-Fi chip 121 and the Bluetooth chip 122 may perform communication using WiFi and Bluetooth methods, respectively. The wireless communication chip 123 may refer, for example, to a chip including communication circuitry that performs communication according to various communication standards such as, for example, and without limitation, IEEE, ZigBee, 3G (3rd Generation), 3GPP (3rd Generation Partnership Project), LTE (Long Term Evolution), or the like. In addition, the communicator 120 may further include an NFC chip including communication circuitry operating using an NFC (Near Field Communication) method which uses the 13.56 MHz band among various RF-ID frequency bands such as, for example, and without limitation, 135 kHz, 13.56 MHz, 433 MHz, 860 to 960 MHz, or the like. For example, the communicator 120 may perform communication with the external electronic device 200 using the NFC method. The communicator 120 may also communicate with the server 300, which may be implemented as a router, via a Wi-Fi network.

The processor 140 may include various processing circuitry and generally controls an operation of the user terminal device 100 using various programs stored in the storage 110.

For example, the processor 140 may execute an application stored in the storage 110 to configure and display an execution screen of the application, or may play back various contents stored in the storage 110. The processor 140 may perform communication with external devices through the communicator 120.

For example, the processor 140 may include a RAM 141, a ROM 142, a main CPU 143, a graphics processing unit 144, first through nth interfaces 145-1 through 145-*n*, and a bus 146.

The RAM 141, the ROM 142, the main CPU 143, the graphics processing unit 144, the first to nth interfaces 145-1 to 145-*n*, etc. may be connected to each other via the bus 146.

The first to nth interfaces 145-1 to 145-*n* are connected to the various components described above. One of the interfaces may, for example, be a network interface connected to an external device via a network.

The main CPU 143 may access the storage 110 and performs booting using an O/S stored in the storage 110. Then, the main CPU 143 performs various operations using various programs, contents, data, and the like stored in the storage 110.

The ROM 142 may store a set of instructions for system booting and the like. When a turn-on command is input and power is supplied, the main CPU 143 may copy the O/S stored in the storage 110 to the RAM 141 according to the instruction stored in the ROM 142, execute the O/S and boot a system. When booting is completed, the main CPU 143 may copy various application programs stored in the storage 110 to the RAM 141, execute the application program copied to the RAM 141, and perform various operations.

The graphics processing unit 144 provides a screen including various objects such as an icon, an image, a text, etc. using a calculator (not shown) and a renderer (not shown). The calculator calculates an attribute value such as a coordinate value, a shape, a size, a color, etc. to be displayed by each of the objects based on a layout of the screen using a control command obtained from an input device. The renderer provides a screen of various layouts including the objects based on the attribute value calculated by the calculator. The screen provided by the renderer is displayed within a display region of the display 130.

The user interface 150 may obtain various user commands.

For example, the user interface 150 may obtain a specific request from a user. The request may be transmitted to the external electronic device 200 via the server 300 according to an embodiment of the disclosure such that the user terminal device 100 may obtain a response corresponding to the request. The user interface 150 may obtain various user commands such as, for example, and without limitation, a user command for operating an application, a user command for performing various functions in the service screen, and the like.

The user interface 150 may be implemented, for example, and without limitation, as a touch screen when the user terminal device 100 is implemented as a touch-based portable terminal. However, the user interface 150 may be implemented as various forms such as, for example, and without limitation, a remote control receiver, a mouse, a physical button, a camera, a microphone, or the like, according to an implementation example.

Figure 3:
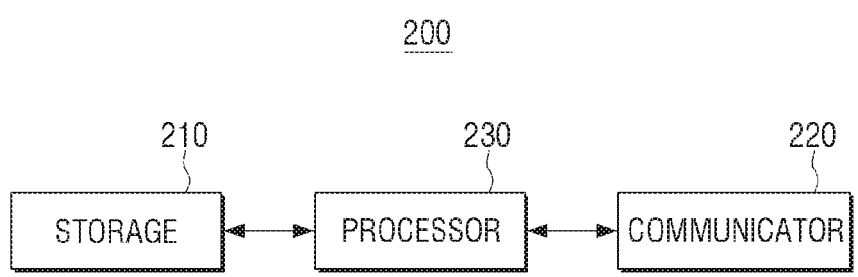
FIG. 3 is a block diagram illustrating an example configuration of an electronic device according to an embodiment of the disclosure.

FIG. 3 is a block diagram illustrating an example configuration of the electronic device 200 according to an embodiment of the disclosure.

Referring to FIG. 3, the electronic device 200 includes a storage 210, a communicator (e.g., including communication circuitry) 220, and a processor (e.g., including processing circuitry) 230. Basic operations of the storage 210 and the communicator 220 are the same as or similar to those shown in FIG. 2A, and thus descriptions of the basic operations may not be repeated.

When authentication of the user terminal device 100 is completed, the storage 210 may include identification information for the user terminal device 100. For example, the storage 210 may include, for example, and without limitation, a product name, a serial number, an IP address, and the like, of the user terminal device 100.

The storage 210 may store the authentication information for performing authentication with respect to the user terminal device 100. For example, the storage 210 may include, for example, and without limitation, a password, a PIN code, fingerprint information, iris information, facial recognition information, and the like, for authentication with the user terminal device 100. The storage 210 may store an encryption module that supports an encryption service according to an embodiment of the disclosure.

The storage 210 may store identification information of a first user terminal device and a second user terminal device that have been authenticated according to a predetermined authentication procedure. For example, the storage 210 may store, for example, and without limitation, product names, serial numbers, IP addresses, and the like, of the first user terminal device and the second user terminal device.

The communicator 220 may include various communication circuitry connected to a second network and may communicate with the server 300. The second network may be implemented as, for example, and without limitation, a wireless fidelity (WI-FI) network, and accordingly, the communicator 220 may include communication circuitry including a Wi-Fi module, but is not limited thereto.

In addition, the communicator 220 may perform wireless communication with the user terminal device 100 through a communication method such as, for example, and without limitation, BT (BlueTooth), Zigbee, or IR (Infrared), or the like, but may perform communication with the user terminal device 100 and the server 300 through various communication methods such as, for example, and without limitation, Serial Interface, USB (Universal Serial Bus), NFC (Near Field Communication), or the like.

For example, when mutual authentication between the user terminal device 100 and the electronic device 200 is performed through a predetermined method (e.g., NFC), device identification information of the user terminal device 100 may be transmitted to the electronic device 200 (200), and accordingly a pairing procedure between both devices may be performed. Through this pairing process, the communicator 220 may obtain identification information of the electronic device 200 from the user terminal device 100 and store the identification information in the storage 210.

The processor 230 may include various processing circuitry and controls the overall operation of the electronic device 200.

The processor 230 may decrypt an encrypted request based on a predetermined encryption scheme when the encrypted request transmitted from the server 300 through the communicator 220 is obtained from the server 300, and obtain a response corresponding to the decrypted request based on the decrypted request.

For example, the encrypted request may be obtained from the server 300 via the second network. For example, the second network may be a non-public type network, and may be a network with a more excellent (higher) security than a first network that may, for example, be a public type network.

The processor 230 may access a server corresponding to a service included in the decrypted request to obtain a response to the service, and may encrypt the obtained response using the predetermined encryption scheme.

The processor 230 may encrypt the obtained response using the predetermined encryption scheme and transmit the encrypted response including the identification information of the user terminal device 100 to the server 300. For example, the identification information of the user terminal device 100 may include an IP address of the user terminal device 100. However, the disclosure is not limited to this, and the identification information of the user terminal device 100 may include various information, such as, for example, and without limitation, a product name, a serial number, and the like.

For example, when the decrypted request is a request to access a site having a specific URL, the processor 230 may access a server of a site corresponding to the decrypted request and obtain a screen of the site, e.g., a response corresponding to the request, and encrypt the response using the predetermined encryption scheme. The processor 230 may then transmit an encrypted response including the IP address of the user terminal device 100 to the server 300. Accordingly, the server 300 may identify the IP address and transmit the encrypted response to the user terminal device 100.

The server 300 may, for example, be a router that transmits the encrypted response to another router. For example, the router may be a device for connecting different networks, and may include, for example, a sharer.

For example, assume that a user's smart phone is mutually authenticated with the home refrigerator using a predetermined method and the encryption mode is executed, and the user selects Wi-Fi called "Airport" at the airport. When a request for accessing the specific portal site via Wi-Fi is input from the user, the smart phone may transmit the request to a router connected to the home refrigerator, for example, the sharer, through a router in the airport corresponding to Wi-Fi called "Airport". The home refrigerator may obtain the request from the sharer, access and encrypt the specific portal site, which is a response corresponding thereto, and transmit the response to the router in the airport corresponding to "Airport" through the sharer.

According to an embodiment of the disclosure, the processor 230 may obtain an encrypted request from the first user terminal device that shares the predetermined encryption scheme with the electronic device 200 and transmit a response corresponding thereto to the second user terminal device which does not share the predetermined encryption scheme with the electronic device 200. For example, because the second user terminal device does not share the predetermined encryption scheme with the electronic device 200, when the processor 230 obtains the encrypted response, the processor 230 may not decrypt the encrypted response. Accordingly, the processor 230 may decrypt the encrypted request transmitted from the first user terminal device based on the predetermined encryption scheme to obtain the response corresponding thereto, and transmit the obtained response to the second user terminal device via the server 300 without encrypting the obtained response.

The processor 230 may include identification information of a target device in the encrypted request obtained from the first user terminal device. For example, the target device may refer, for example, to a device in which the response corresponding to the encrypted request is reached, and in the above example, the target device may be the second user terminal device. The identification information of the target device may include, for example, an IP address of the target device, but is not limited thereto.

According to another embodiment, the first user terminal device and the second user terminal device may be registered in the electronic device 200 using a predetermined method (e.g., an NFC method) and the predetermined encryption scheme may be shared.

When the encrypted request obtained from the first user terminal device includes identification information of the second user terminal device, the processor 230 may obtain an encrypted response to the encrypted request and transmit the encrypted response including the identification information of the second user terminal device to the server 300.

For example, the processor 230 may transmit the encrypted response to the server 300 via the second network.

For example, when a user using the first user terminal device in a state where the encryption mode is being executed selects Wi-Fi called "Airport" at the airport and inputs a request for transmitting a photo to the second user terminal device via a server that uses the Wi-Fi, the electronic device 200 may obtain the request from the first user terminal device via the server 300 and upload the photo to the server 300. The electronic device 200 may obtain a feedback response indicating that the photo has been uploaded to the server 300, encrypt the uploaded photo, and transmit the encrypted photo to the second user terminal device via the server 300.

Figure 4:
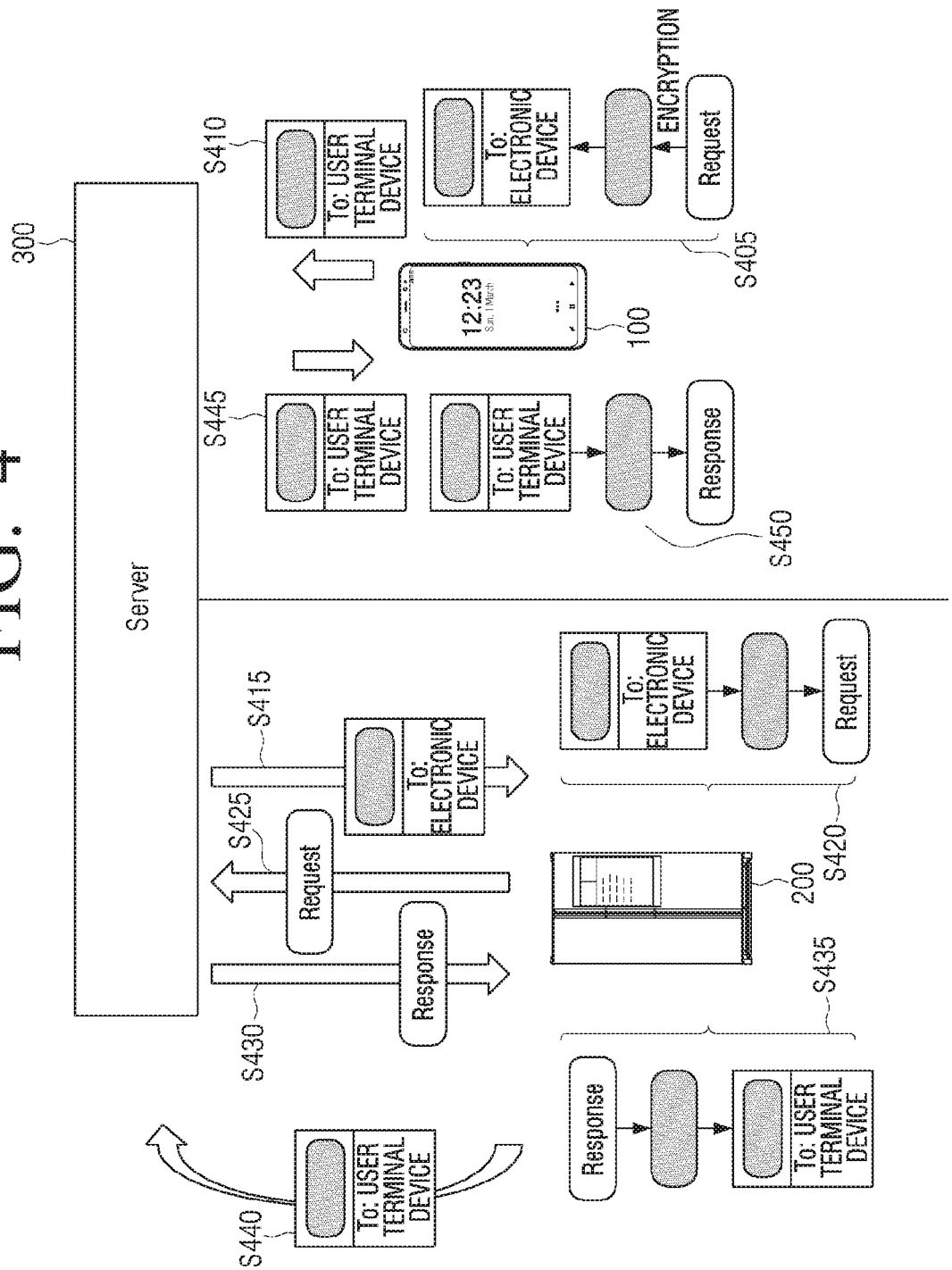
FIG. 4 is a diagram illustrating an example of a user terminal device and an electronic device that operate via a server according to an embodiment of the disclosure.

FIG. 4 is a diagram illustrating an example user terminal device 100 and the electronic device 200 that operate via a server according to an embodiment of the disclosure.

Referring to FIG. 4, the user terminal device 100 may encrypt a request input in an encryption mode based on a predetermined encryption scheme, and may include identification information of the electronic device 200 in the request (S405).

For example, the encryption mode may be a mode supporting an encryption function for a request input from a user. The encryption mode may be executed by the user when the user terminal device 100 and the electronic device 200 are mutually authenticated using a predetermined method. However, the encryption mode may be executed according to a user manipulation after mutual authentication is completed using the predetermined method. The encryption mode may be executed based on a threshold preset in a risk of a network.

The user terminal device 100 may transmit the encrypted request including the identification information of the electronic device 200 to the server 300 (S410). For example, the user terminal device 100 may transmit the encrypted request including the identification information of the electronic device 200 to the server 300 via a first network.

For example, the server 300 may be a router that transmits the encrypted request to another router. For example, the router may refer, for example, to a device for connecting different networks, and may include a sharer. For example, the server 300 may perform a function of connecting the first network to which the user terminal device 100 is connected and the second network to which the external electronic device 200 is connected.

For example, assuming that a user's smart phone is mutually authenticated with the home refrigerator using a predetermined method and the encryption mode is executed, the user selects Wi-Fi called "Airport" at the airport to access a specific portal site. When a request for accessing the specific portal site via Wi-Fi is input from the user, the request may be transmitted to a router at home, that is, a sharer, through a router in the airport corresponding to Wi-Fi called "Airport".

The encrypted request transmitted from the user terminal device 100 may be obtained in the electronic device 200 from the server 300 via the second network (S415). The electronic device 200 may decrypt the encrypted request based on the predetermined encryption scheme to obtain the request input to the user terminal device 100 (S420).

Thereafter, the electronic device 200 may obtain a response corresponding to the decrypted request. For example, the electronic device 200 may access a server corresponding to a service included in the decrypted request (S425) and obtain the response to the service (S430). The electronic device 200 may encrypt the obtained response using a predetermined encryption scheme. The electronic device 200 may encrypt the obtained response using the predetermined encryption scheme (S435) and include the identification information of the user terminal device 100 in the encrypted response (S440).

For example, when the decrypted request is a request to access a specific portal site, the electronic device 200 may access a server of the site corresponding to the decrypted request, obtain a screen of the site, e.g., a response corresponding to the request, and encrypt the response using the predetermined encryption scheme. The electronic device 200 may then transmit an encrypted response including an IP address of the user terminal device 100 to the server 300 through the second network.

When the encrypted response to the encrypted request is obtained from the server 300 (S445), the user terminal device 100 may decrypt the encrypted response based on a predetermined encryption scheme (S450). Thereafter, the user terminal device 100 may provide the decrypted response through the display 130.

For example, when the decrypted response may be a response to connect to a specific portal site, the user terminal device 100 may provide a screen of the site corresponding to the decrypted response.

For example, the predetermined encryption scheme may, for example, and without limitation, be an encryption scheme using a symmetric key (a secret key) (e.g., block encryption such as DES, AES, SEED, HIGHT, etc. and string encryption), an encryption scheme using an asymmetric key (a public key) (e.g., RSA, ElGamal, ECC, etc.) an encryption scheme using a hash function (e.g., SHA, HAS-160), or the like, but is not limited thereto.

For example, when the predetermined encryption scheme is an asymmetric key method, in case that the user terminal device 100 previously stores the public key and a private key, and the external electronic device 200 stores the public key owned by the user terminal device 100, the user terminal device 100 may decrypt the response encrypted and transmitted by the external electronic device 200 through the public key using the private key. For example, the public key may be exchanged between the user terminal device 100 and the external electronic device 200 by a predetermined method. For example, the public key may be exchanged in a variety of cases, such as when the smart phone and the home refrigerator are in physical contact using the NFC method.

Figure 5A:
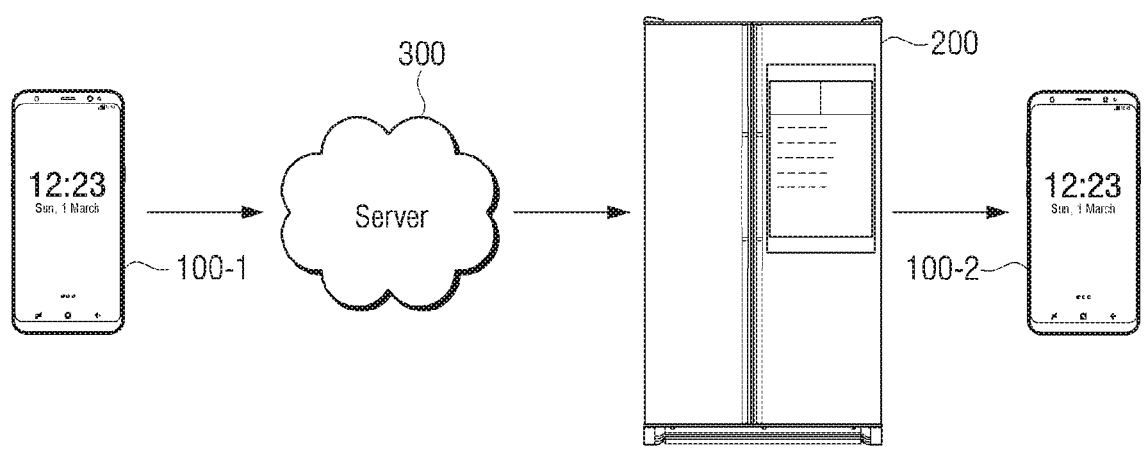
FIG. 5A is a diagram illustrating example operations between different user terminal devices according to an embodiment of the disclosure.

FIG. 5A is a diagram illustrating example operations between different user terminal devices according to an embodiment of the disclosure.

Referring to FIG. 5A, the electronic device 200 may obtain an encrypted request from a first user terminal device 100-1 that shares a predetermined encryption scheme with the electronic device 200 via the server 300, and transmit a response corresponding thereto to a second user terminal device 100-2 that does not share the predetermined encryption scheme with the electronic device 200. For example, because the second user terminal device 100-2 does not share the predetermined encryption scheme with the electronic device 200, when the electronic device 200 obtains the encrypted response, the electronic device 200 may not decrypt the encrypted response. Accordingly, the electronic device 200 may decrypt the encrypted request transmitted from the first user terminal device 100-1 based on the predetermined encryption scheme to obtain the response corresponding thereto, and transmit the obtained response to the second user terminal device 100-2 via the server 300 without encrypting the obtained response.

The electronic device 200 may include identification information of a target device in the encrypted request obtained from the first user terminal device 100-1. For example, the target device may refer, for example, to a device in which the response corresponding to the encrypted request is reached, and in the above example, the target device may be the second user terminal device 100-2. The identification information of the target device may include, for example, and without limitation, an IP address of the target device, but is not limited thereto.

Figure 5B:
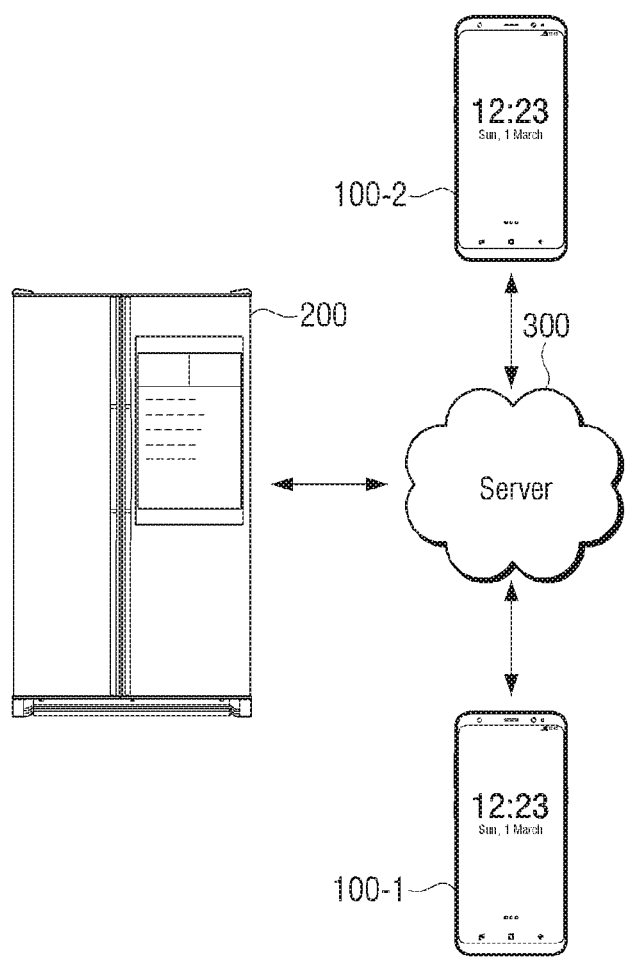
FIG. 5B is a diagram illustrating example operations when different user terminal devices are registered in an electronic device.

FIG. 5B is a diagram illustrating example operations when different user terminal devices are registered in the electronic device 200.

Referring to FIG. 5B, a plurality of user terminal devices may be registered in the electronic device 200 using a predetermined method, and a predetermined encryption scheme may be shared. Accordingly, the electronic device 200 may store identification information of the first user terminal device 100-1 and the second user terminal device 100-2 registered in the electronic device 200. For example, the predetermined method may be, for example, and without limitation, NFC, a key exchange protocol specified in the OIC standard, Easy Setup, or the like, when an IoT environment is used. The predetermined method may, for example, be a method of encrypting a key used by an AP providing a routing function, and a method in which a user directly inputs a key to the user terminal device 100 and a PC such that the PC serves as the external electronic device 200.

The first user terminal device 100-1 may encrypt a request input in an encryption mode based on the predetermined encryption scheme and include identification information of the electronic device 200 in the request. For example, the identification information may be an IP address of the electronic device 200.

The first user terminal device 100-1 may transmit the encrypted request including the identification information of the electronic device 200 to the server 300 via a first network. For example, the server 300 may be a router for transmitting the encrypted request to another router. For example, the router may refer, for example, to a device for connecting different networks, and may include a sharer.

The encrypted request transmitted from the first user terminal device 100-1 may be obtained in the electronic device 200 from the server 300 via a second network. The electronic device 200 may decrypt the encrypted request based on the preset encryption scheme to obtain the request input to the first user terminal device 100-1 and destination information that the request finally arrives. For example, the obtained destination information may be an IP address of the second user terminal device 100-2.

The electronic device 200 may obtain a response corresponding to the decrypted request. For example, the electronic device 200 may access a server corresponding to a service included in the decrypted request to obtain the response to the service. The electronic device 200 may encrypt the response obtained based on the obtained destination information using a predetermined encryption scheme and include identification information of a device corresponding to a destination in the encrypted response (e.g., S440 in FIG. 4). For example, the electronic device 200 may include the IP address of the second user terminal device 100-2 in the encrypted response.

The electronic device 200 may transmit the encrypted response including the identification information to the server 300 via the second network.

For example, when a user using the first user terminal device 100-1 in a state where the encryption mode is being executed selects Wi-Fi called "Airport" at the airport and inputs a request for transmitting a photo to the second user terminal device 100-2 via a server that uses the Wi-Fi, the first user terminal device 100-1 may encrypt the request and transmit the encrypted request to the server 300. The electronic device 200 may obtain the encrypted request from the first user terminal device 100-1 via the server 300 and decrypt the encrypted request to obtain the photo and destination information of the second user terminal device 100-2. The electronic device 200 may upload the obtained photo to the server 300. The electronic device 200 may obtain a feedback response indicating that the photo has been uploaded to the server 300, encrypt the uploaded photo, include the IP address of the second user terminal device 100-2 in the encrypted photo and transmit the encrypted photo to the second user terminal device 100-2 via the server 300.

The second user terminal device 100-2 may decrypt the encrypted response based on a predetermined encryption scheme when the encrypted response to the encrypted request is obtained from the server 300. Thereafter, the second user terminal device 100-2 may provide the decrypted response.

For example, when the decrypted response is a photo, the second user terminal device 100-2 may provide the photo to the user.

According to another embodiment, when only the first user terminal device 100-1 is registered in the electronic device 200, the electronic device 200 may decrypt the encrypted request obtained from the first user terminal device 100-1 via the server 300 and obtain a response corresponding to the decrypted request. Unlike the above-described example embodiment, the electronic device 200 may transmit the decrypted response to the second user terminal device 100-2 which is not registered in the electronic device 200 without encrypting the obtained response. Because the second user terminal device 100-2 is not registered in the electronic device 200, when the encrypted response is obtained, the second user terminal device 100-2 may not decrypt the encrypted response.

Figure 6:
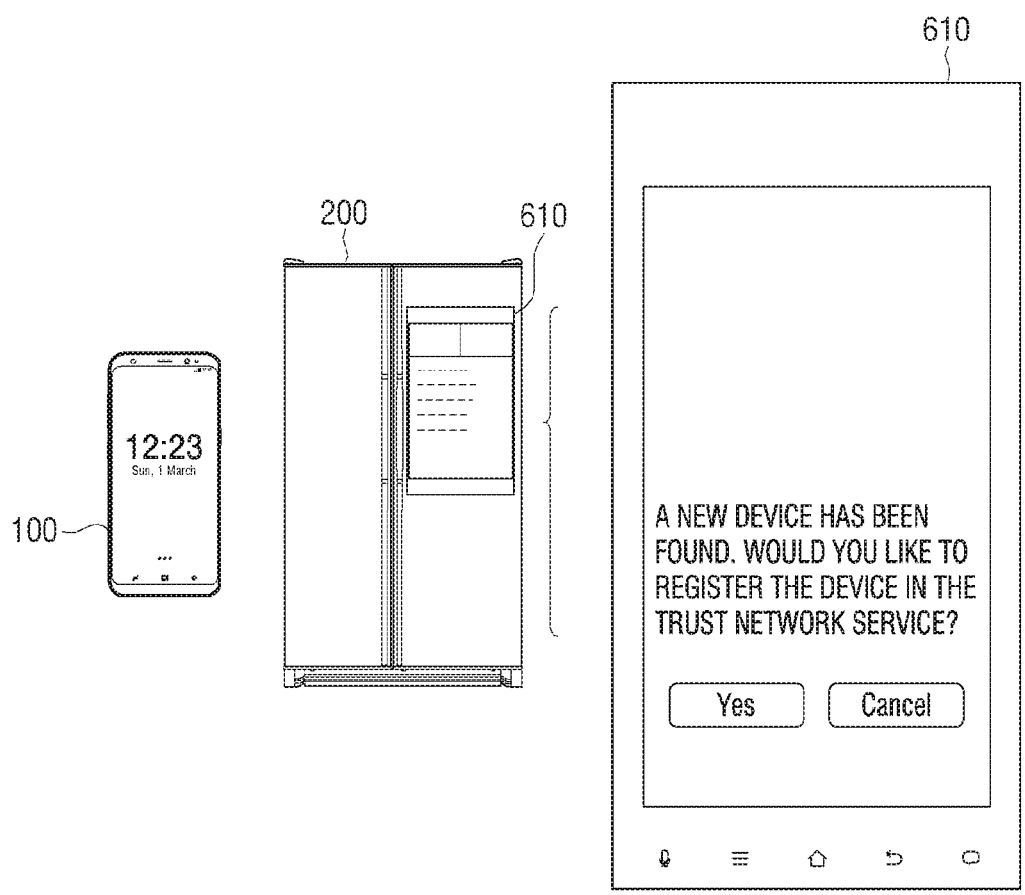
FIG. 6 is a diagram illustrating an example user interface used to register a user terminal device in an electronic device according to an embodiment of the disclosure.

FIG. 6 is a diagram illustrating an example user interface used to register the user terminal device 100 in the electronic device 200 according to an embodiment of the disclosure.

The user terminal device 100 and the electronic device 200 may perform mutual authentication using a predetermined method. For example, the predetermined method may include, for example, and without limitation, an NFC method, a same password or PIN code input method, a biometric authentication information input method, or the like. For example, in case of the NFC method, in a state where an NFC mode of the user terminal device 100 is executed, when the user terminal device 100 physically approaches a predetermined region of the electronic device 200, keys for encryption between both devices may be exchanged. In case of the password or PIN code input method, in a state in which a connection mode for mutual connection is executed in the user terminal device 100 and the electronic device 200, when the same password or PIN code is input to each device, keys for encryption between both devices may be exchanged. In case of the biometric authentication information input method, in a state in which a connection mode for mutual connection is executed in the user terminal device 100 and the electronic device 200, when the same biometric information is input to each device, keys for encryption between both devices may be exchanged. For example, when the same fingerprint information, iris information, and/or facial recognition information is input to each device, both devices may complete mutual authentication and store and store identification information of a counter device.

Referring to FIG. 6, when authentication of the user terminal device 100 is completed according to various embodiments described above, the electronic device 200 may provide feedback informing that the user terminal device 100 has been found to a user and provide a display window 610 to select whether to register the user terminal device 100. For example, a text "A new device has been found. Would you like to register the device in the trust network service?" may be displayed on the display window 610. However, this is merely an example and other texts may be displayed, and the disclosure is not limited to the specifically illustrated text. The electronic device 200 may provide information indicating whether the user terminal device 100 that has been authenticated is registered to the user using various types of methods.

However, even before the electronic device 200 authenticates the user terminal device 100, when the user terminal device 100 is searched as a peripheral device in the electronic device 200, the electronic device 200 may display the text "A new device has been found. Would you like to register the device in the trust network service?" on the display window 610. For example, when the electronic device 200 searches for a peripheral device for Bluetooth communication with the peripheral device, and the user terminal device 100 is searched, the electronic device 200 may display a text asking whether to register the user terminal device 100 to the trust network service.

FIGS. 7A, 7B, 7C, 7D, 7E, 7F and 7G are diagrams illustrating an example encryption mode according to an embodiment of the disclosure.

Hereinafter the encryption mode will be described as a "secure connection". However, this is merely an example and it should be understood that the name indicating the encryption mode may be changed into various forms.

Figure 7A:
FIGS. 7A, 7B, 7C, 7D, 7E, 7F and 7G are diagrams illustrating an example encryption mode according to an embodiment of the disclosure.
Figure 7B:
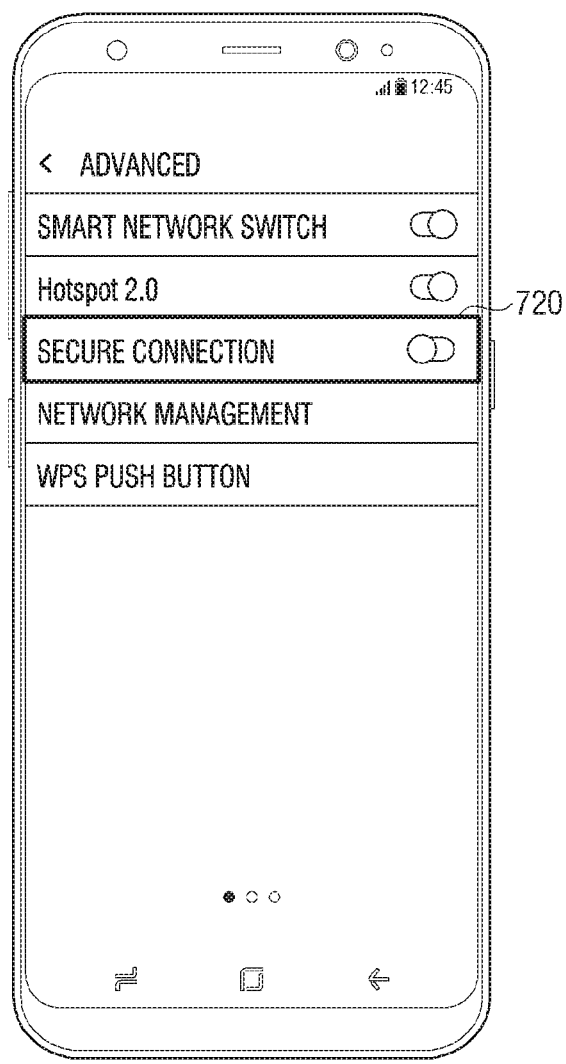

Referring to FIGS. 7A and 7B, the user terminal device 100 may provide a connectable WiFi list. An "advanced" setting item 710 may be provided on a screen provided with the connectable WiFi list. When the "advanced" setting item 710 is selected, the user terminal device 100 may provide various setting lists related to Wi-Fi. For example, the user terminal device 100 may provide a "secure connection" item 720. Referring to FIG. 7B, the "secure connection" is not executed. A state in which the "secure connection" is not executed may be a state in which the "secure connection" may not be executed because a condition that the "secure connection" may be executed is not satisfied or may be a state in which the "secure connection" is not executed according to a user manipulation even in the state in which the "secure connection" may be executed because the condition that the "secure connection" may be executed is satisfied.

The condition that the "secure connection" may be executed may be, for example, a condition that authentication of the electronic device 200 is completed and the electronic device 200 is registered in the user terminal device 100, but the disclosure is not limited thereto.

Figure 7C:
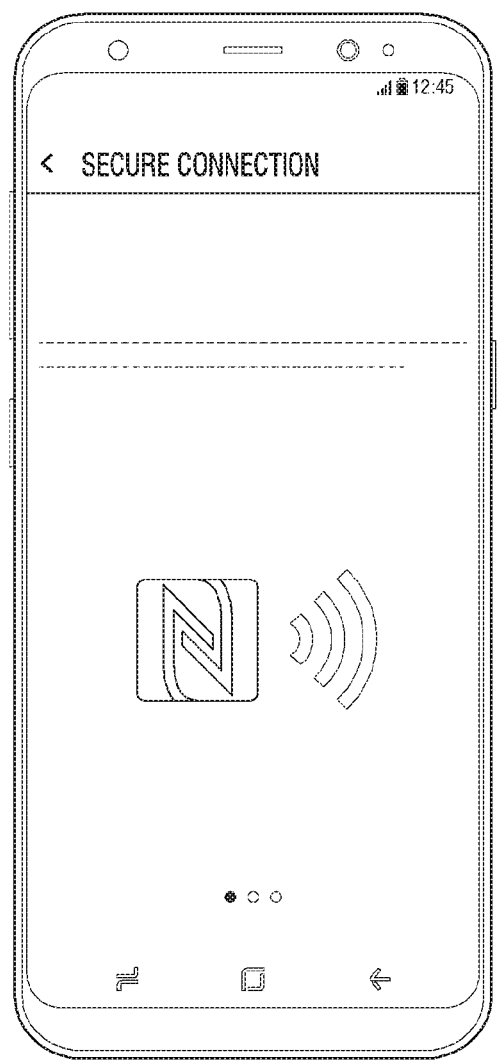

Referring to FIG. 7C, when the "secure connection" item 720 is selected in the absence of the electronic device 200 registered in the user terminal device 100, a text explaining a method of registering the electronic device 200 according to a predetermined method may be provided. For example, when the predetermined method is an NFC method, the user terminal device 100 may provide the text and an image explaining the method of registering the electronic device 200 using the NFC method. When the predetermined method is fingerprint authentication information, the user terminal device 100 may provide the text, the image, animation, or the like explaining the method of registering the electronic device 200 through previously stored fingerprint information.

Figure 7D:
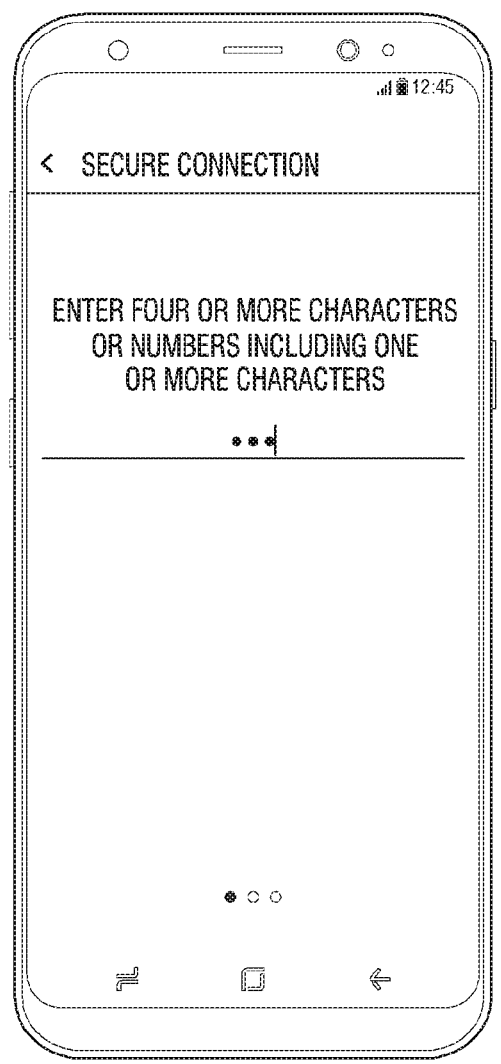

Referring to FIG. 7D, when there is the electronic device 200 registered in the user terminal device 100, a screen for obtaining a password from the user may be provided. The user terminal device 100 may obtain and store the password from the user when registering the electronic device 200. Thereafter, when the user wishes to use the "secure connection" item 720 as shown in FIG. 7D, the user terminal device 100 may obtain the password from the user to identify whether the user is a legitimate user. The user terminal device 100 may compare the password input from the user with a password input when registering the electronic device 200, when the passwords are identical, identify the user as the legitimate user and execute the "secure connection".

The user terminal device 100 may request a password input when the secure connection is first used for a specific electronic device, or may request a password input every time it is turned on and executed in a state where the "secure connection" is turned off. The reliability of security may be improved by performing authentication on whether the user is the legitimate user through the password input.

However, such an authentication is not limited to a password method, and a method based on fingerprint information, iris information, facial recognition information, or the like may be used. Also, an authentication procedure for whether the user is the legitimate user may be omitted according to a user setting.

Figure 7E:
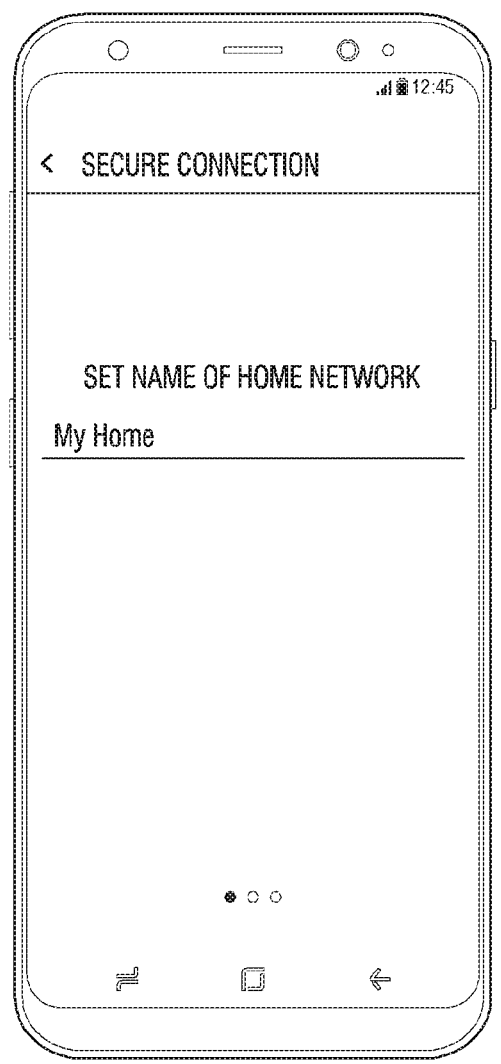

Referring to FIG. 7E, a screen for inputting a name of the electronic device 200 registered in the user terminal device 100 may be provided. For example, when the electronic device 200 registered in the user terminal device 100 is a home refrigerator, the name may be input as "My Home" as shown in FIG. 7E. After the name is input, the home refrigerator registered in the user terminal device 100 may be displayed as "My Home". For example, when not only the home refrigerator but also a company refrigerator is registered as "My Work" in the user terminal device 100, the user terminal device 100 may provide "My Home" and "My Work" when selecting the "secure connection". The user may be provided with a directly input name to immediately recognize the corresponding device, and thus convenience may be improved.

Figure 7F:
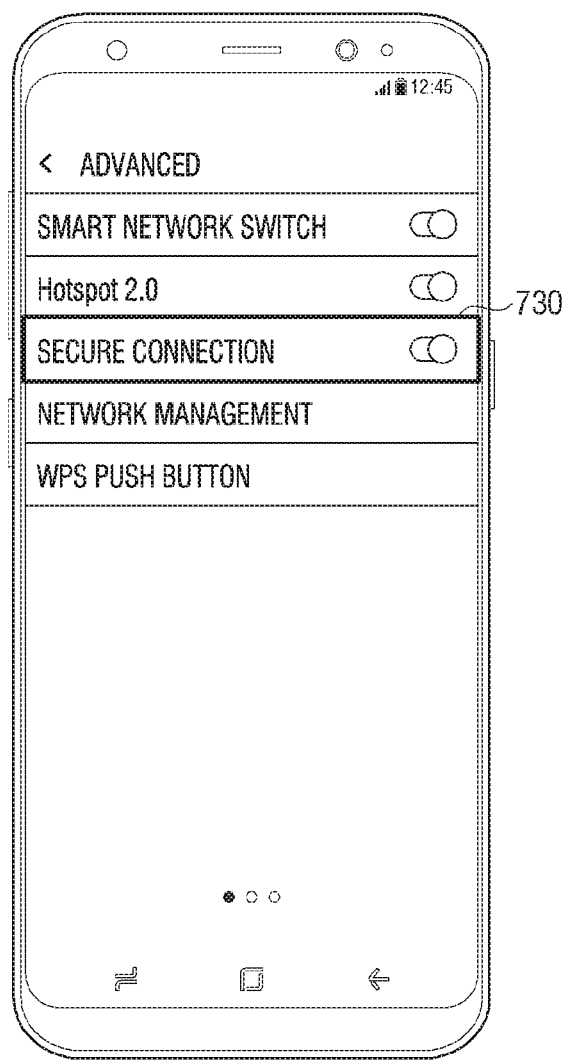

Referring to FIG. 7F, when authentication for the electronic device 200 is completed and registered in the user terminal device 100, the "secure connection" may be executed according to a predetermined event (730). For example, the predetermined event may, for example, and without limitation, be at least one of an event in which authentication for the electronic device 200 is completed and registered in the user terminal device 100 and the electronic device 200 is registered in the user terminal device 100, an event according to a user manipulation for the user to turn on the "secure connection", an event in which a network exceeding a predetermined risk is selected on a network list provided by the user terminal device 100, or the like. For example, the event in which the network exceeding the predetermined risk is selected will be described in greater detail below with reference to FIG. 7G.

Figure 7G:
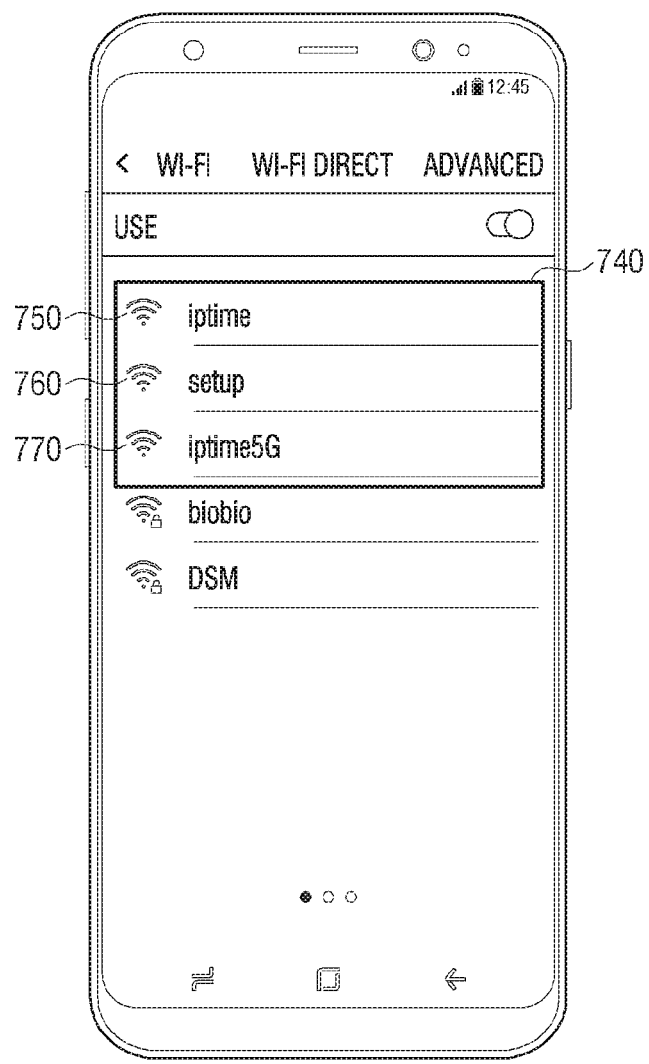

Referring to FIG. 7G, the user terminal device 100 may identify a risk of each network based on a response time at which response data for test data is obtained. The user terminal device 100 may provide a network list and may display identification information of each network included in the network list in a different color based on the risk of each network (740).

Generally, in the absence of a malicious action due to a malicious network, a response time for obtaining response data to the test data is stable, that is, a deviation between response times is short. However, in case that there is the malicious action, the response time is delayed, which may increase the deviation between response times. Therefore, a predetermined threshold value for the deviation of the response time may be stored in the user terminal device 100 in advance. The processor 140 may identify the risk of each network based on the predetermined threshold value for the deviation of the response time. The predetermined threshold value may be plural.

When the deviation of the response time is lower than a first threshold, the user terminal device 100 may identify the network as a secure network and displays identification information of the corresponding network in a blue color (750). When the deviation of the response time is equal to or greater than the first threshold and a second threshold or less, the user terminal device 100 may identify the corresponding network as a risky network in which the malicious action may occur and display identification information of the corresponding network in an orange color (760). When the deviation of the response time is equal to or greater than the second threshold value, the user terminal device 100 may identify the corresponding network as a network with a high probability of occurrence of the malicious action and display identification information of the corresponding network in a red color (770). The user may identify a network having a risk for the malicious action through different coloring of the network information. Accordingly, the user may not select such a network, or select the network having the risk in a state in which the encryption mode is executed, thereby securing security. Here, the color indicating the identification information of the network according to the risk is merely an example, and the disclosure is not limited thereto.

The user terminal device 100 may execute the encryption mode when the deviation of the response time is equal to or larger than the second threshold value. When the deviation of the response time is equal to or greater than the first threshold, the user terminal device 100 may execute the encryption mode and even when there is a relatively low probability of the malicious action, to execute the encryption mode, thereby increasing the reliability of security.

Figure 8:
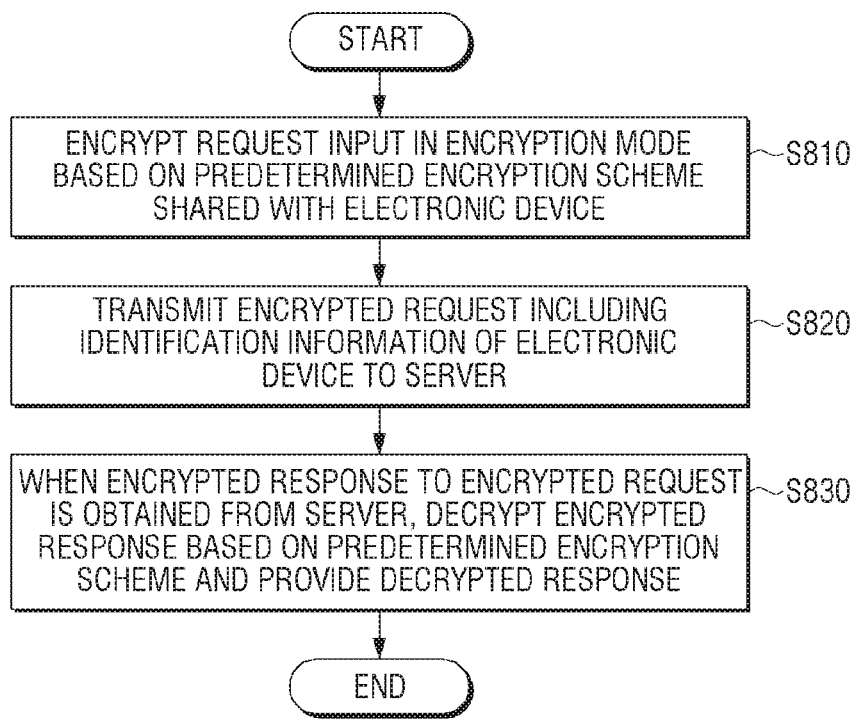
FIG. 8 is a flowchart illustrating an example method of controlling a user terminal device according to an embodiment of the disclosure.

FIG. 8 is a flowchart illustrating an example method of controlling the user terminal device 100 according to an embodiment of the disclosure.

The user terminal device 100 may encrypt a request input in an encryption mode based on a predetermined encryption scheme shared with the electronic device 200 (S810). The user terminal device 100 may transmit an encrypted request including identification information of the electronic device 200 to the server 300 (S820).

When obtaining an encrypted response to the encrypted request from the server 300, the user terminal device 100 may decrypt the encrypted response based on a predetermined encryption scheme and provide the decrypted response (S830).

A detailed operation of each step is described above, and thus a detailed description thereof will not be repeated here.

Figure 9:
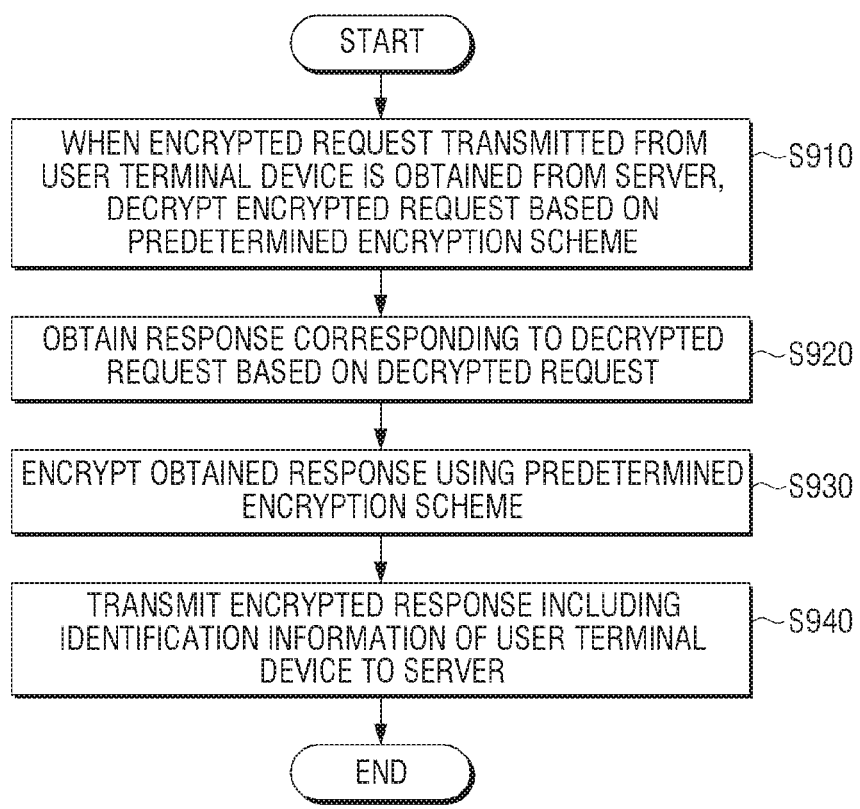
FIG. 9 is a flowchart illustrating an example method of controlling an electronic device according to an embodiment of the disclosure.

FIG. 9 is a flowchart illustrating an example method of controlling an electronic device according to an embodiment of the disclosure.

The electronic device 200 may decrypt an encrypted request based on a predetermined encryption scheme when obtaining the encrypted request transmitted from the user terminal device 100 from the server 300 (S910).

The electronic device 200 may obtain a response corresponding to a decrypted request based on the decrypted request (S920). The electronic device 200 may encrypt the obtained response using a predetermined encryption scheme (S930).

The electronic device 200 may transmit an encrypted response including identification information of the user terminal device 100 to the server 300 (S940).

A detailed operation of each step is described above, and thus a detailed description thereof will not be repeated here.

On the other hand, at least some configurations of the methods according to various embodiments of the disclosure described above may be implemented in the form of an application that may be installed in an existing electronic device.

At least some configurations of the methods according to various example embodiments of the disclosure described above may be implemented with software upgrade or hardware upgrade with respect to the existing electronic devices.

At least some configurations of the methods according to various example embodiments of the disclosure described above may be performed through an embedded server provided in an electronic device, or an external server of the electronic device.

The various example embodiments described above may be implemented in a recording medium which may be read by a computer or a similar device using software, hardware, or any combination thereof. In some cases, the embodiments described herein may be implemented by a processor itself. According to a software implementation, embodiments such as the procedures and functions described herein may be implemented in separate software modules. Each of the software modules may perform one or more of the functions and operations described herein.

Computer instructions for performing processing operations according to the various embodiments described above may be stored in a non-transitory computer-readable medium. The computer instructions stored in the non-transitory computer-readable medium may cause a specific device to perform the processing operations according to the various embodiments described above when executed by a processor.

The non-transitory computer-readable medium is a medium that semi-permanently stores data and is readable by a device. Examples of the non-transitory computer-readable medium include, without limitation, CD, DVD, hard disk, Blu-ray disk, USB, memory card, ROM, and the like.

Although various example embodiments of the disclosure have been illustrated and described above, the disclosure is not limited to the described example embodiments, but may be variously modified by those skilled in the art to which the disclosure pertains without departing from the scope and spirit of the disclosure as disclosed, for example, in the accompanying claims and their equivalents. These modifications should also be understood to fall within the scope of the disclosure.

What is claimed is:

1. A user terminal device comprising:
a storage configured to store identification information of an external electronic device sharing a predetermined encryption scheme based on which the user terminal device and the external electronic device are mutually authenticated;
a communicator comprising communication circuitry; and
a processor configured to control the user terminal device to:
encrypt a request input in an encryption mode based on the predetermined encryption scheme,
transmit the encrypted request comprising the identification information of the electronic device to an external server through the communicator, and
decrypt and provide an encrypted response based on the predetermined encryption scheme based on the encrypted response to the encrypted request being obtained from the server,
wherein processor is further configured to control the user terminal to:
transmit test data comprising the identification information of the electronic device to the server through each network included in a list of networks connectable with the user terminal device, and identify a risk level of each network in said list of networks based on a response time at which response data for the test data is obtained.

2. The user terminal device as claimed in claim 1,
wherein the identification information of the electronic device comprises an IP address of the electronic device, and
wherein the server comprises a router configured to transmit the encrypted request to another router.

3. The user terminal device as claimed in claim 1, wherein based on authentication of the electronic device being performed, the processor is configured to control the user terminal to register the identification information comprising an IP address of the electronic device in the encryption mode.

4. The user terminal device as claimed in claim 1, further comprising a display,
wherein the processor is configured to control the display to: provide the list of networks on the display and display identification information of each network included on the list of networks in a different color based on the risk level of each network.

5. The user terminal device as claimed in claim 1, further comprising a display,
wherein the processor is configured to control the display to: provide the list of networks on the display and execute the encryption mode based on a network selected from the list of networks exceeding a predetermined risk level.

6. A control method of a user terminal device storing identification information of an external electronic device sharing a predetermined encryption scheme based on which the user terminal device and the external electronic device are mutually authenticated, the control method comprising:
encrypting a request input in an encryption mode based on the predetermined encryption scheme shared with the electronic device,
transmitting the encrypted request comprising the identification information of the electronic device to an external server; and
decrypting and providing an encrypted response based on the predetermined encryption scheme based on the encrypted response to the encrypted request being obtained from the server,
transmitting test data comprising the identification information of the electronic device to the server through each network included in a list of networks connectable with the user terminal device; and
identifying a risk level of each network based on a response time at which response data for the test data is obtained.

7. The control method as claimed in claim 6,
wherein the identification information of the electronic device comprises an IP address of the electronic device, and
wherein the server comprises a router configured to transmit the encrypted response to another router.

8. The control method as claimed in claim 6, further comprising: registering the identification information comprising an IP address of the electronic device in the encryption mode based on authentication of the electronic device being performed.

9. The control method as claimed in claim 6, further comprising: providing the list of networks and displaying identification information of each network included on the list of networks in a different color based on the risk level of each network.

10. The control method as claimed in claim 6, further comprising: providing the list of networks and executing the encryption mode based on a network selected from the list of networks exceeding a predetermined risk level.

11. The user terminal device as claimed in claim 1, wherein the encryption mode is selectively executed to encrypt the request input based on a risk level associated with a network used to communicate with the external electronic device.

12. The user terminal device as claimed in claim 1, wherein the encryption mode is selectively executed to encrypt the request input based on receiving a user input after the mutual authentication between user terminal device and the external electronic device is completed.

13. The user terminal device as claimed in claim 1, wherein the encryption mode is executed to encrypt the request input based on a comparison between a predetermined risk level and a risk level of a network selected to communicate with the external electronic device.

14. The user terminal device as claimed in claim 1, wherein the request input in an encryption mode is a request input by a user using a user interface of the electronic device.

* * * * *